HIGH DENSITY MAGNETIC RECORDING MEDIUM

Filed Feb. 19, 1962

INVENTORS.
Masaaki Morita
BY Shuji Murata
Shigetaka Higuchi
Hill, Sherman, Meroni, Gross & Simpson ATTORNEYS 3,242,005
HIGH DENSITY MAGNETIC RECORDING MEDIUM Masaaki Morita, Kamakura-shi, Kanagawa-ken, and Shuji Murata and Shigetaka Higuchi, Sendai-shi, Miyagi-ken, Japan, assignors to Sony Corporation, Tokyo, Japan, a corporation of Japan Filed Feb. 19, 1962, Ser. No. 173,926
Claims priority, application Japan, Feb. 25, 1961, 36/6,632
2 Claims. (Cl. 117—160)

The present invention relates to an improved magnetic recording medium, and more specifically, to a magnetic recording medium which has excellent heat resisting properties, abrasion resistant properties, proper flexibility, and excellent magnetic characteristics. The record medium of present invention is particularly suitable for use as a magnetic video recording tape.

In the usual method of manufacture of magnetic recording media, a non-magnetic carrier, i.e., tape or sheet, is coated with a magnetic iron oxide powder in combination with a binder. However, many of such magnetic recording media are not satisfactory for highly sensitive recordings since their saturation residual magnetic flux density is comparatively low. Especially, in high frequency range the saturation residual magnetic flux density is very low.

An object of the present invention to provide an improved magnetic recording medium with heat resistance, abrasion resistance, and flexibility.

Still another object of the invention is to provide an improved binder for securing magnetic particles to a non-magnetic base.

Still another object of the invention is to provide an improved magnetic recording medium which has a high saturation residual magnetic flux density.

In accordance with the present invention, we prepare the improved magnetic record member by applying to a non-magnetic base such as paper or a synthetic resin, a coating composition which includes finely divided magnetizable particles and a special binder. The binder consists of a mixture of a polyvinyl chloride-acetate copolymer in combination with a polyurethane resin. The polyurethane constitutes more than about 30% by weight of the combined resins, but is preferably not in excess of 70% by weight of the combined resins.

The improved binder of the present invention can be used with various magnetic powders but we prefer to use the binder with a binary alloy of iron and cobalt or a ternary alloy of iron, nickel and cobalt. In the binary systems, suitable alloys are those containing 90 to 20 mol percent of iron and 10 to 80 mol percent of cobalt. In ternary systems, the nickel concentration should be less than about 40 mol percent, with the cobalt being present in amounts of from 10 to 70 mol percent, and iron constituting the balance. A typical alloy for this use contains 40 mol percent iron, 55 mol percent cobalt, and 5 mol percent nickel. The alloy particles are preferably less than three microns in particle size and are typically needle shaped crystals most of which have a maximum dimension of less than one micron.

The addition of the polyurethane resin provides substantial improvements in the heat resistance and abrasion resistance for the magnetic record member. The vinyl chloride-acetate system provides the improved flexibility and adhesiveness to the underlying non-magnetic base.

If desired, other materials can also be added to the binder, such as surface lubricants, surface activators for improving the dispersibility of the coating, plasticizers, and stabilizers for preventing the polyvinyl chloride from decomposing.

A further description of the present invention will be made in conjunction with the attached sheet of drawing in which.

Figure 1:
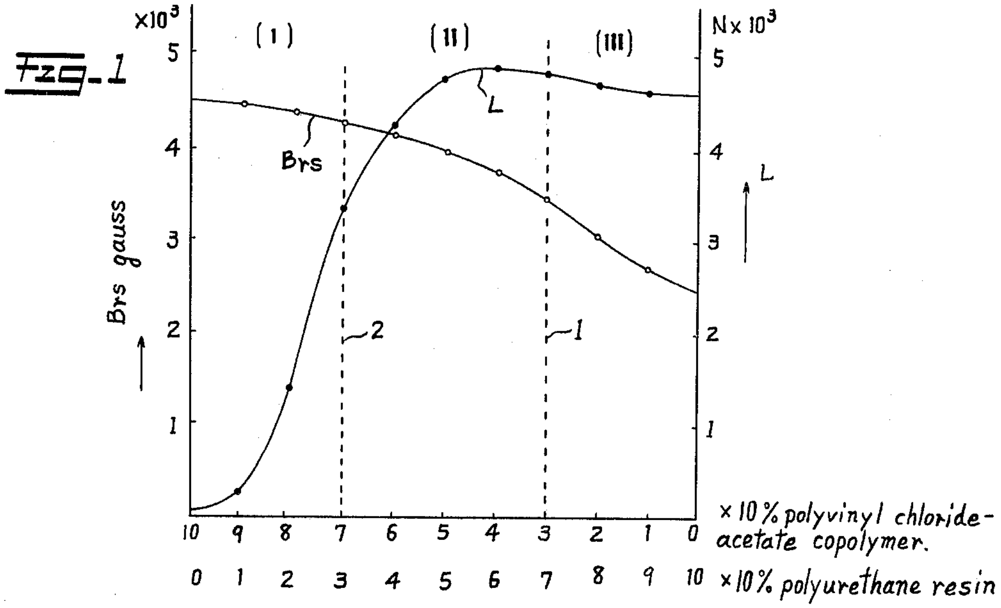
FIGURE 1 is a graph illustrating the magnetic characteristics and life properties of the magnetic record medium, based upon its composition.

In FIGURE 1, there is shown a plot comparing the saturation residual magnetic flux density B*rs* as well as the life of the magnetic medium, both compared to the ratio of binders when employing a mixture of vinyl chloride-acetate copolymer and a polyurethane resin. The magnetic layer of the magnetic medium consisted of an iron-nickel-cobalt alloy powder. From this graph it will be seen that as the amount of polyurethane resin is increased the B*rs* decreases. However, the life of the medium, illustrated by the curve "L" is substantially improved when polyurethane is added to the polyvinyl chloride-acetate copolymer. For best results, therefore, we prefer to operate within the ranges denoted by the lines 1 and 2, to wit, the concentration of polyurethane in excess of 30%, but not in excess of about 70% by weight of the combined resins.

In magnetic tape particularly designed to operate within the audio frequency range, the contact pressure between the magnetic head and the medium is not as large as it is in the case of video recording tapes. For such systems, the medium may employ a concentration of polyurethane less than about 30% by weight, in order to improve the magnetic sensitivity. For video recording, however, we prefer that the concentration of polyurethane resin be at least 30% and preferably in the range from 30 to 70%. At a concentration in excess of about 70%, the abrasion resistance is still good, but the sensitivity of the tape becomes lower.

Figures 2, 3:
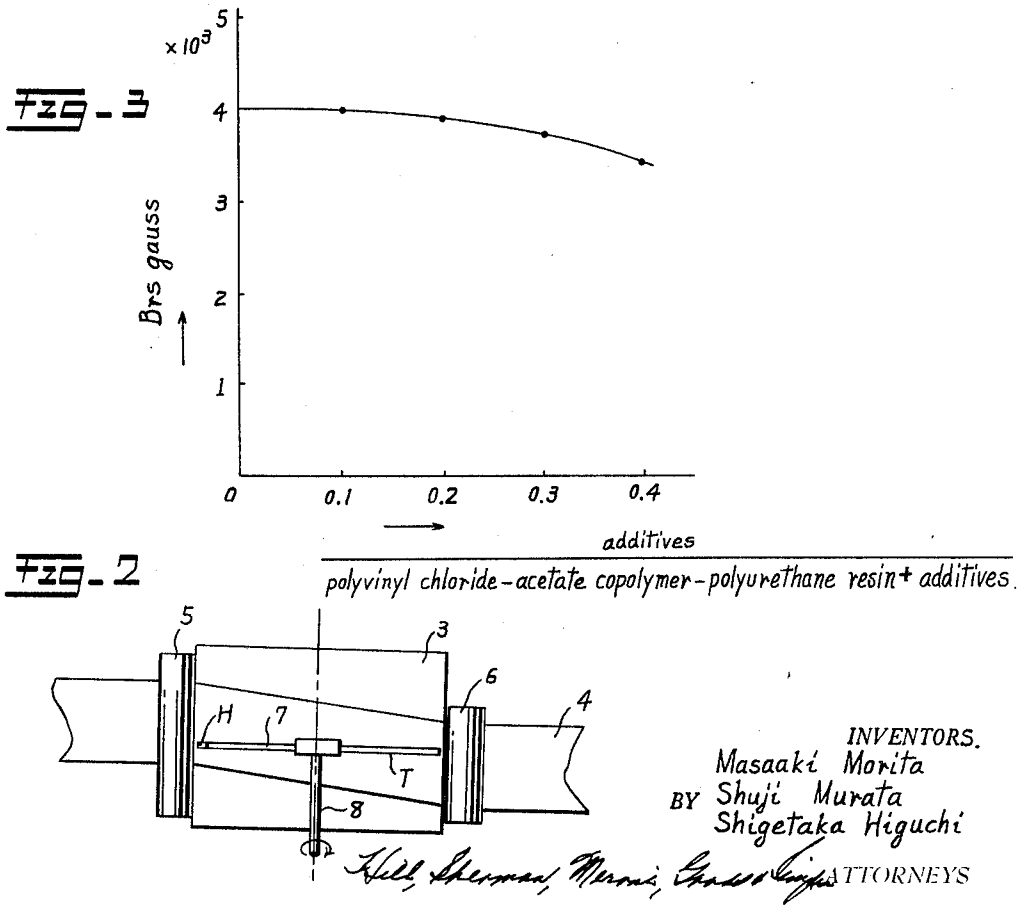
FIGURE 2 is a somewhat schematic diagram of a video tape testing arrangement.
FIGURE 3 is a graph illustrating the manner in which the magnetic characteristics of the tape depend on the ratio of binder and additives.

The life tests of the magnetic medium were carried out in the following manner. As illustrated in FIGURE 2, we employed a cylindrical guide 3 on which a video tape 4 to be tested was attached obliquely and pressed by two guide rollers 5 and 6. An arm 7 driven by a rotary shaft 8 carried a magnetic head H which contacted the surface of the video tape 4. Video signals recorded on the recording medium were reproduced by means of a magnetic video reproducing device and passed to a cathode ray tube. The medium 4 is not transferred, but the magnetic head H alone is revolved at a high speed to scan a predetermined track T thereon. The time required for the resulting picture to get out of shape is measured, and the number of scans of the head can then be determined.

*Example*

An iron-nickel-cobalt alloy containing 40 mol percent iron, 5 mol percent nickel, and 55 mol percent cobalt in an amount of one kilogram was combined with small quantities of a surface active agent, a lubricant, a stabilizer, a plasticizer, and 125 grams of the polyvinyl-chloride-acetate copolymer known commercially as "Vinylite VAGH." In addition, 92.5 grams of a polyester resin and 1,900 grams of cyclohexane, i.e., solvent were added and mixed. Then, 32.5 grams of an isocyanate was added, to react with the polyester in the production of the polyurethane resin. The mixture was agitated sufficiently until it became uniform. The coating mixture was then laid onto a "Mylar" base to a thickness of less than five microns, after filtration. Finally the surface of the painted layer was treated by means of a calender, and left at a temperature of 50 to 70° C. for twenty-four hours to become hardened. The $B_{rs}$ curve of the recording medium thus attained is illustrated in FIGURE 3. The medium had the following characteristics:

$B_{rs}$=more than 3500 gauss
$H_c$ (coercive force)=more than 500 oersteds
$B_r/B_m$=0.7 (applied field $H_a$=1,300 oersteds)

It was also found that a recording could be made at wavelengths of one-half to one-quarter of the threshold wavelength capable of being recorded on ordinary audio tape of gamma ferric oxide as the recording medium. It was further found that the transfer characteristic of the new tape was small as compared with typical audio frequency tapes.

It will be evident that various modifications can be made to the described embodiments without departing from the scope of the present invention.

We claim as our invention:

1. A magnetic recording medium comprising a flexible non-magnetic carrier, and a magnetizable coating on said carrier, said coating including particles of an iron-cobalt alloy containing 90 to 20 mol percent iron and the balance cobalt, said coating also including a physical mixture of a vinyl chloride-vinyl acetate copolymer and a polyurethane resin consisting of a polyester-isocyanate reaction product, said polyurethane resin constituting more than 30% by weight but not more than 70% of the resin mixture.

2. A magnetic recording medium comprising a flexible non-magnetic carrier, and a magnetizable coating on said carrier, said coating including particles of a nickel-cobalt-iron alloy containing up to 40 mol percent nickel, from 10 to 70 mol percent cobalt, and the balance iron, said coating also including a physical mixture of a vinyl chloride-vinyl acetate copolymer and a polyurethane resin consisting of a polyester-isocyanate reaction product, said polyurethane resin constituting more than 30% by weight but not more than 70% by weight of the resin mixture.

References Cited by the Examiner

UNITED STATES PATENTS

| | | | |
|---|---|---|---|
| 2,454,678 | 11/1948 | Smith et al. | 260—45.4 |
| 2,606,162 | 8/1952 | Coffey et al. | 260—75 |
| 2,806,835 | 9/1957 | Nischk et al. | 260—45.4 |
| 2,806,836 | 9/1957 | Nischk et al. | 260—45.4 |
| 2,882,260 | 4/1959 | Bartl et al. | 260—45.4 |
| 2,888,433 | 5/1959 | Parker | 260—75 |
| 2,948,707 | 8/1960 | Benning | 260—2.5 |
| 2,978,414 | 4/1961 | Harz et al. | |
| 2,989,415 | 6/1961 | Horton et al. | |
| 3,001,891 | 9/1961 | Stoller. | |
| 3,049,442 | 8/1962 | Haines et al. | |

FOREIGN PATENTS

| | | |
|---|---|---|
| 761,451 | 11/1956 | Great Britain. |
| 814,225 | 9/1951 | Germany. |

OTHER REFERENCES

Saunders, and Frisch "Polyurethanes: Chemistry and Technology Part I," "High Polymers Vol. XVI," 1962, Mack Printing Co., p. 351.

Dombrow, Polyurethanes, p. 134, Reinhold, New York, 1957.

WILLIAM D. MARTIN, *Primary Examiner.*

RICHARD D. NEVIUS, MURRAY KATZ, *Examiners.*